United States Patent [19]

Ramillon

[11] Patent Number: 5,247,731
[45] Date of Patent: Sep. 28, 1993

[54] METHOD FOR FORMING A RESTRAINT FOR A CIRCULAR PART IN A TUBULAR PART

[75] Inventor: Jean-Pierre Ramillon, Perly-Certoux/Geneva, Switzerland

[73] Assignee: Honeywell Lucifer, S.A., Geneva, Switzerland

[21] Appl. No.: 918,458

[22] Filed: Jul. 22, 1992

[30] Foreign Application Priority Data

Aug. 2, 1991 [CH] Switzerland ............... 2300/91

[51] Int. Cl.⁵ .................................. B23P 11/00
[52] U.S. Cl. ................................ 29/511; 29/516
[58] Field of Search ............ 29/509, 511, 888.4, 29/888.44, 888.46, 890.124, 890.126, 890.13, 890.132, 515, 516; 411/151

[56] References Cited

U.S. PATENT DOCUMENTS

| | | | |
|---|---|---|---|
| 1,686,665 | 10/1928 | Jacobi | 29/511 |
| 2,108,525 | 2/1938 | Carington et al. | 29/511 X |
| 2,187,661 | 1/1940 | Lochrane | 29/511 X |
| 2,278,025 | 3/1942 | Sadoski | 29/511 |
| 3,147,537 | 9/1964 | Fadow | 29/511 |
| 3,441,293 | 4/1969 | Bagnulo | 29/511 X |
| 4,504,166 | 3/1985 | Morin | 29/898.046 |
| 4,559,692 | 12/1985 | Morin | 29/511 X |
| 4,712,928 | 12/1987 | Brandenstein | 411/151 X |
| 4,722,619 | 2/1988 | Reiser et al. | 29/515 X |
| 4,850,096 | 7/1989 | Gotoh et al. | 29/508 |
| 5,025,546 | 6/1991 | Gotoh et al. | 29/508 |
| 5,136,772 | 8/1992 | Rupprecht et al. | 29/511 |

FOREIGN PATENT DOCUMENTS

| | | |
|---|---|---|
| 2923192 | 12/1979 | Fed. Rep. of Germany . |
| 2498494 | 7/1982 | France . |
| 1326420 | 3/1988 | U.S.S.R. . |
| 2205138 | 11/1988 | United Kingdom . |

Primary Examiner—Timothy V. Eley
Attorney, Agent, or Firm—Kane, Dalsimer, Sullivan, Kurucz, Levy, Eisele & Richard

[57] ABSTRACT

The object of the method is to form a restraint intended to retain a split ring 5 for fixing a part, in particular a circular part 3 on an internal bearing surface 4 of the tubular part. The method consists in deforming a thinned portion 7 of the tubular part by means of a tool 9 using the split ring 5 as a means for forming the restraint.

10 Claims, 6 Drawing Sheets

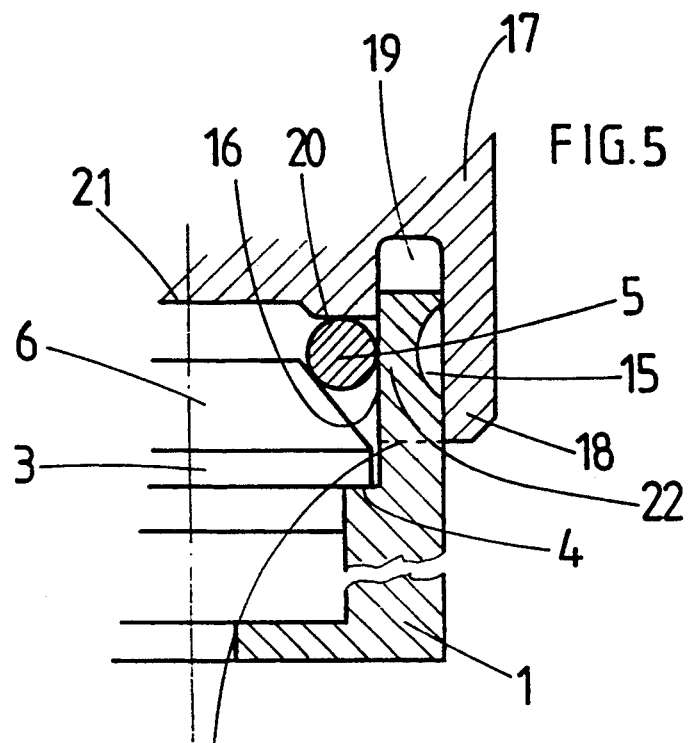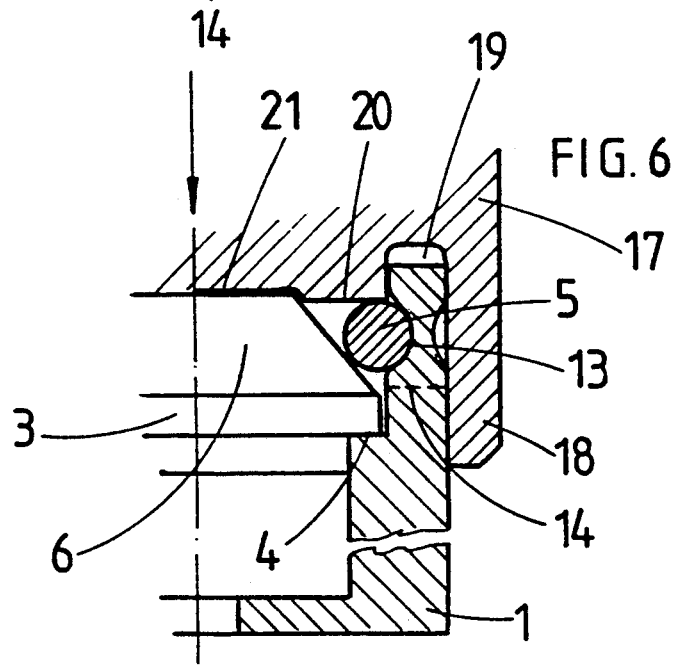

METHOD FOR FORMING A RESTRAINT FOR A CIRCULAR PART IN A TUBULAR PART

FIELD OF THE INVENTION

The subject of the present invention is a method for forming, in the internal wall of a tubular cylindrical part, a restraint intended to retain a ring for fixing at least one part on an internal bearing surface of the tubular part, according to which the wall of the tubular part is thinned, on its perimeter, in the region of the place where said restraint is to be formed, the part to be fixed is put in place, the ring is put in place on the part, the thinned zone is deformed in at least two places on the ring using the ring as a means for forming the restraint and finally leaving the ring in the restraint which is thus formed.

PRIOR ART

Fixing a circular part in a tubular part is well known, for example a closing plate in a bore, by means of a split ring partially engaged in a groove machined in the internal wall of the tubular part. Machining of such a groove necessitates taking the part up on a lathe. Although the cost of such an operation is relatively insignificant for an expensive high precision part, on the contrary, it adds considerably to the cost price of numerous parts manufactured in long production runs and at relatively low cost.

Furthermore, from Patent FR 2,498,494 a method is known for manufacturing a ball joint comprising a spherical pivot, according to which a bearing brass is fixed, with prestress and by means of a closure washer by radially deforming the wall of a casing onto the washer via a crimping operation. The fixing obtained cannot be dismantled. This method, moreover, is not applicable to fixing a split ring intended to be able to be removed at a later date by tightening up its elasticity slit.

SUMMARY OF THE INVENTION

The object of the present invention is to produce an internal restraint, in particular an internal groove capable of receiving and retaining a split fixing ring. According to the method of the invention, the ring is a split ring and the thinned wall is deformed over the split ring holding the slit of the split ring open, in such a manner as to be able to remove this split ring at a later date.

The split ring can be toric or of rectangular cross section.

The restraint can be continuous or discontinuous, or even at points.

When the restraint is to be formed near an end of the tubular part, the forming of the restraint amounts to carrying out a simple crimping operation. If the circular part has a frustoconical flank, the ring can bear directly on this frustoconical flank.

The thinned zone can be formed by an external groove. In this case, the split fixing ring is used to push the material of the tubular part outward in its thinned zone. This embodiment may be used in order to form a groove in any region of a tubular part.

The restraint, in particular the groove, thus obtained has a cross section which perfectly matches the fixing ring. Means can be provided to permit the removal of the split ring in certain positions of this ring.

BRIEF DESCRIPTION OF THE DRAWINGS

The appended drawing represents several examples of the implementation of the method of the invention.

FIG. 5 represents a second implementation mode before forming the groove.

FIG. 6 represents the second implementation mode after forming the groove.

DESCRIPTION OF THE PREFERRED EMBODIMENTS

Figure 1:
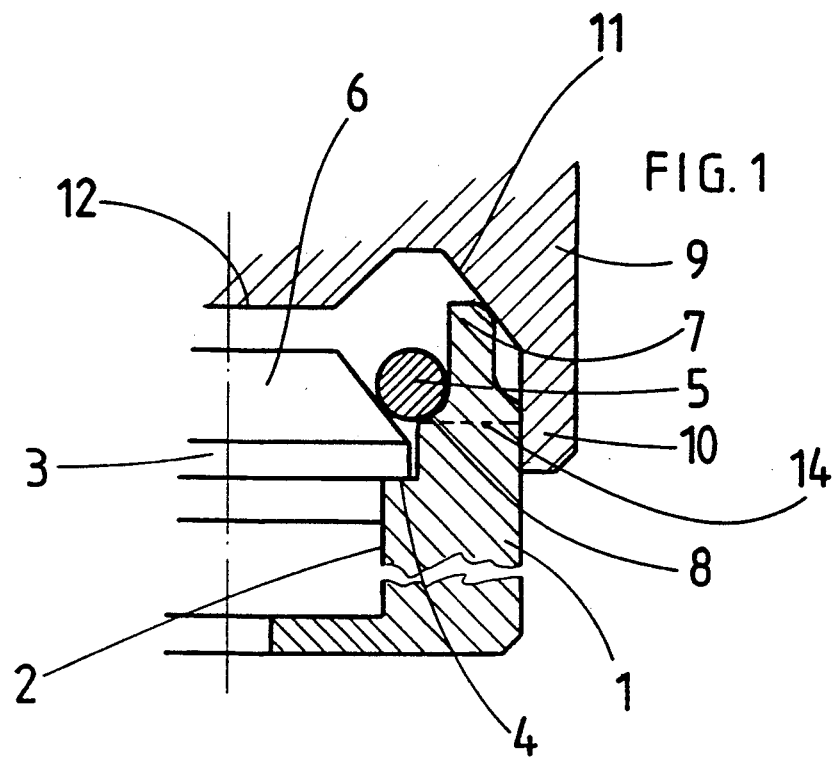
FIG. 1 represents, in axial section, a first implementation mode, before forming a groove.
Figure 2:
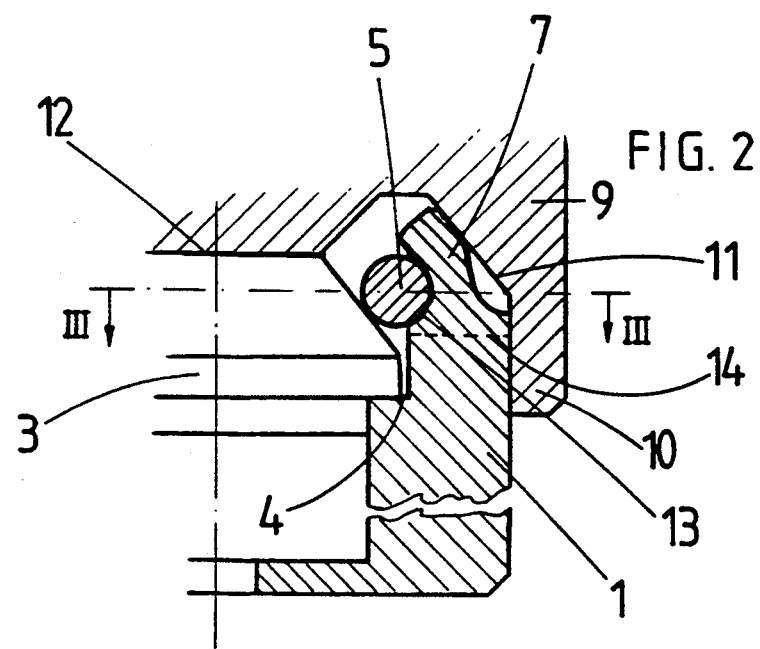
FIG. 2 represents the first implementation mode after forming the groove.

FIG. 1 represents a cylindrical part 1, in this case a valve element, having a cylindrical bore 2 whose upper end must be closed by means of a closure part 3 bearing on a shoulder 4 and held against this shoulder by a toric split ring 5 made from steel or another spring metal bearing on the frustoconical perimeter 6 of the closure part 3. The part 1 is for example made of brass or another sufficiently ductile material.

Above the shoulder 4, the part 1 has a thinned portion 7 of internal diameter greater than the diameter of the part 1 above the shoulder 4. This thinning 7 can be formed by the removal of material or by a rolling or swaging operation. In the example represented, the lower portion 8 has been formed as a groove, but the thinning 7 could be cylindrical up to the shoulder 4.

In order to form the restraint, in this case a groove, which is to retain the ring 5, firstly the closure part 6 is put in place on the shoulder 4, then the ring 5 is introduced into the thinned portion 7, with or without prestress, according to the internal diameter of the portion 7 and the diameter of the relaxed ring 5. The following operation consists in pushing the thinned portion 7 down by means of a tool 9 similar to a crimping tool, having a cylindrical skirt 10 of internal diameter corresponding to the diameter of the part 1, an internal frustoconical adjacent face 11 of the same conicity as the portion of the closure part 3 and a central abutment face 12 coming into abutment on the closure part 3 after a certain travel of the tool 9 limiting the amplitude of the deformation of the portion 7 over the ring 5. When the thinned portion 7 comes to bear on the split ring 5, the force exerted on the split ring is perpendicular to the frustoconical surface 6 in such a way that the split ring does not tend to close up by sliding on the frustoconical surface 6. Thus, by a simple crimping operation, a groove 13 is obtained which perfectly matches the ring 5 and allowing the ring 5 to be removed, if necessary, due to the parallelism between the frustonical face 6 and the knocked-down portion 7, as well as the closure part 3, so long as the internal diameter of the knocked-down portion 7 is slightly greater than the diameter of the closure part 3.

Figure 3:
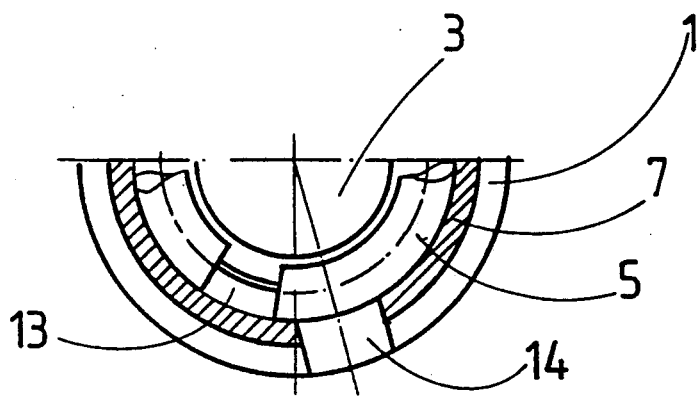
FIG. 3 is a view in half-section along III—III of FIG. 2.
Figure 4:
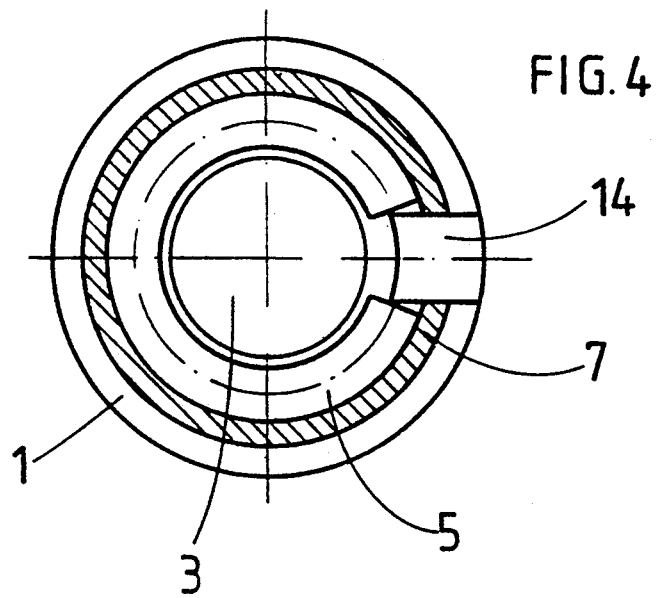
FIG. 4 is a section is similar to that of FIG. 3 representing the fixing ring in another angular position.

In order to allow the removal of the ring 5, a notch 14 is, moreover, cut out in the thinned portion 7, in the region of the groove, as represented in FIG. 3. If the split ring 5 is arranged such that one of its ends is opposite the notch 4, as represented in FIG. 3, it will be possible to remove the ring 5 by lifting this end up by means of a tool, for example a screwdriver, introduced in the notch 14. By contrast, if neither of the ends of the ring 5 is opposite the notch 14, as represented in FIG. 4, or if the ends of the ring are relatively distant from the notch 14, the ring 5 will not be able to be removed.

Thus the fixing can firstly be dismantleable, for example for allowing an adjustment and then not dismantleable, for example in the case of a warranty.

The thinning of the wall of the edge of the part 1 can also be obtained by an external groove 15, as represented in FIG. 5, this groove being able to be formed by any known method, for example by turning or rolling. The internal face 16 of the edge of the part 1 is here simply cylindrical, of a diameter slightly greater than the diameter of the closure part 3.

In order to form the groove 13, firstly the closure part 3 is put in place, then the split ring 5 is introduced, reducing its diameter, into the cylindrical portion 16. Next the ring 5 is forced into the cylindrical portion 16 by means of a tool 17 having a cylindrical skirt 18 of an internal diameter corresponding to the external diameter of the part 1, an annular channel 19 of width such that the edge of the part 1 can freely penetrate therein, a flat annular thrust surface 20 and a central abutment face 21. The lowering of the tool 17 pushes the ring 5 onto the frustoconical flank 6 of the closure part 3 and the ring 5, expanding, pushes the thinned zone 22 of the part 1 outward thus forming its groove 13, as represented in FIG. 6. The deformation is limited by the abutment surface 21 which limits the travel of the tool 17. As in the first embodiment, it is possible to provide a notch 14 for the removal of the ring 5.

Figure 7:
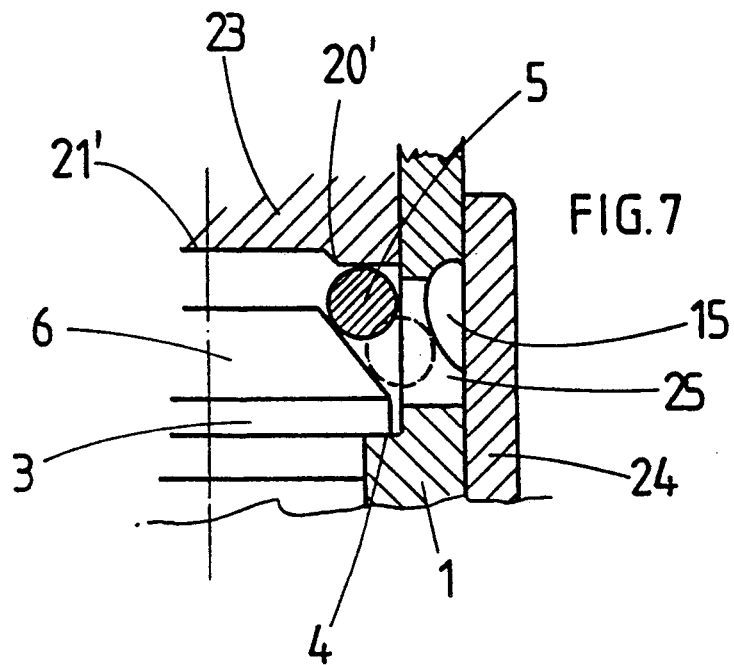
FIG. 7 represents a third implementation mode for forming a groove in any region of a tubular part.

The second embodiment makes it possible to form a groove 13 in any region on a tubular part, as illustrated by FIG. 7. It is expedient simply to use a tool in two portions, that is a pusher 23 and a cylindrical part 24 acting as a counter-tool. The pusher 23 has two front faces 20' and 21' similar to the faces 20 and 21 of the tool 17. The procedure is the same as described in relation to FIGS. 5 and 6. In order to be able to remove the ring 5, a hole 25 is made in the wall of the part 1, in the region of the groove 13.

The first implementation mode of the method also enables the fixing of a flat circular part, that is to say not having a frustoconical flank, in the shape of a disk or annular-shaped.

Figure 8:
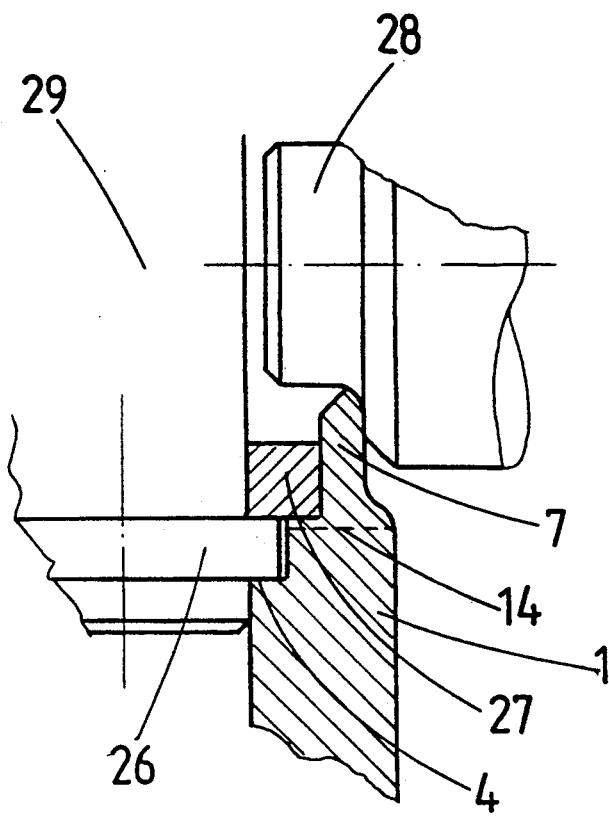
FIG. 8 represents a first variant of the first implementation mode before forming the restraint.
Figure 9:
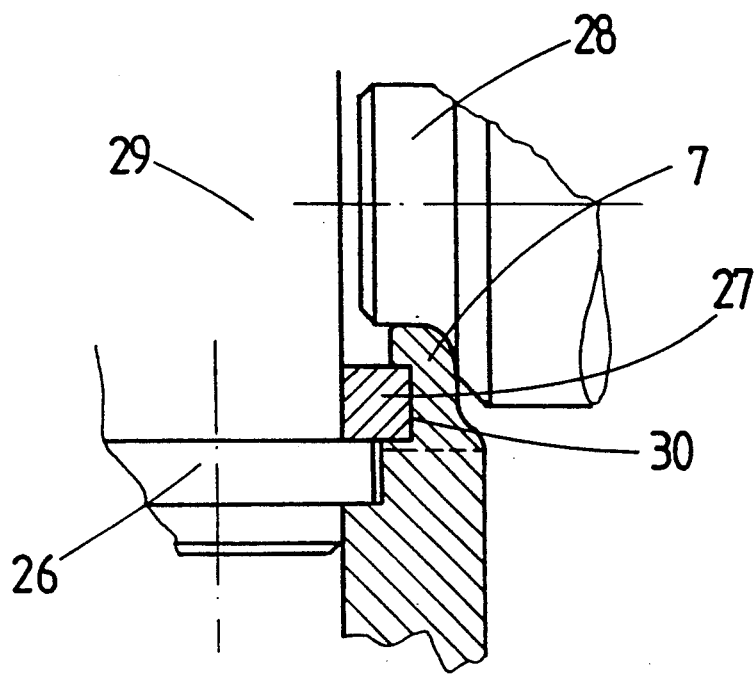
FIG. 9 represents the same variant after forming the restraint.

An example is represented in FIGS. 8 and 9. The part to be fixed is a flat closure part 26, which it is desired to fix by means of a split ring 27 of square cross section. The thinning 7 extends at least up to the region of the closure part 26. The tool is constituted by a crimping tool 28 and a cylindrical part 29 of diameter such that it can be introduced into the ring 27 in order to hold it open during the crimping operation represented in FIG. 9. Thus a groove 30 of rectangular cross section is obtained.

Figure 10:
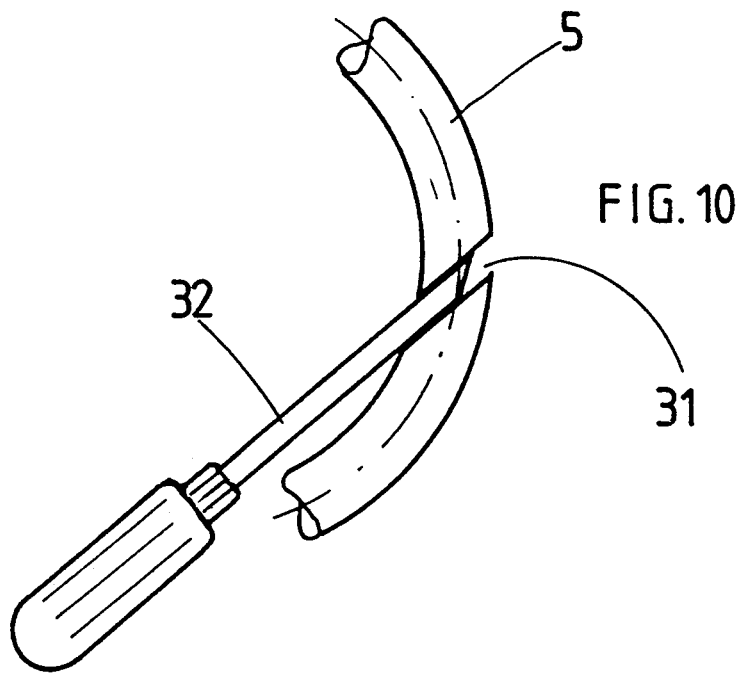
FIG. 10 represents an example of a split ring which can be removed from the inside.

The removal of the split ring, especially in the case of fixing a flat part, can also be done from the inside using a ring having an oblique slit 31 (FIG. 10) in place of a radial slit. This oblique slit makes it possible to introduce a tool, for example a screwdriver 32, in order to release one end of the ring from the restraint.

It is not necessary to form the restraint over the entire perimeter of the tubular part, but it is sufficient to form it in at least two diametrically opposed places or at at least three equidistant points.

Figure 11:
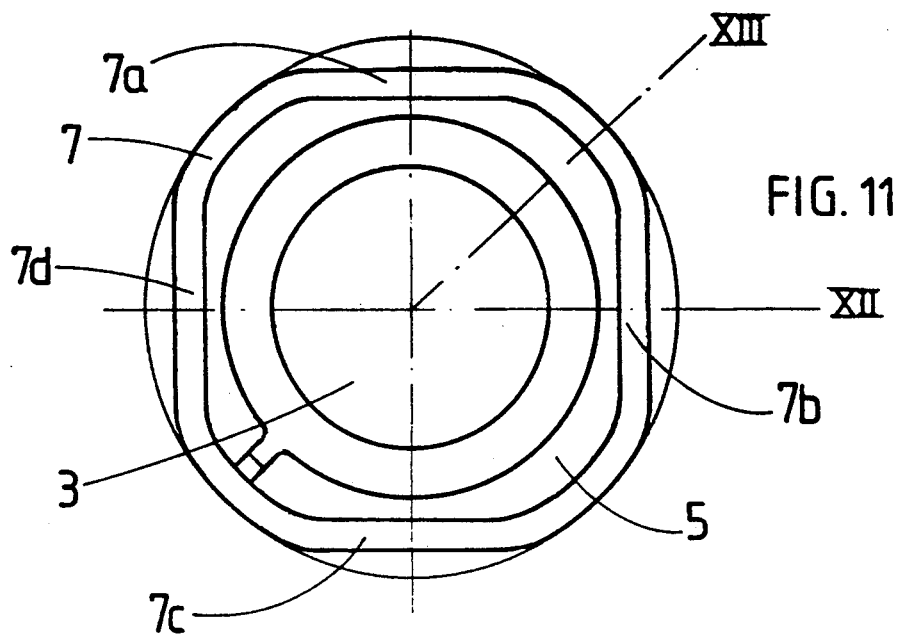
FIG. 11 represents a second variant of the first implementation mode.
Figure 12:
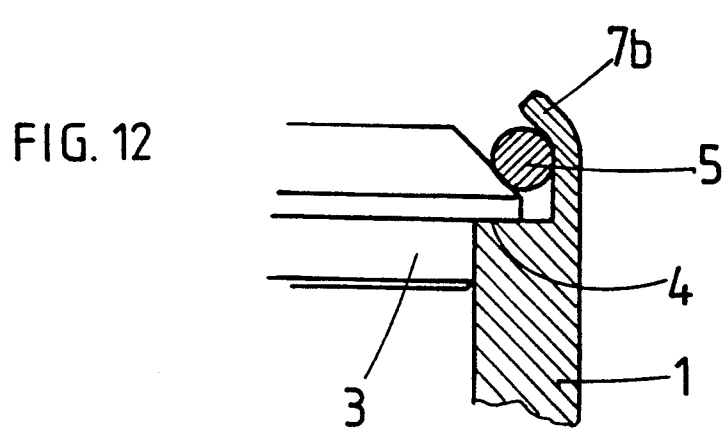
FIG. 12 is a section along XII—XII of FIG. 11.
Figure 13:
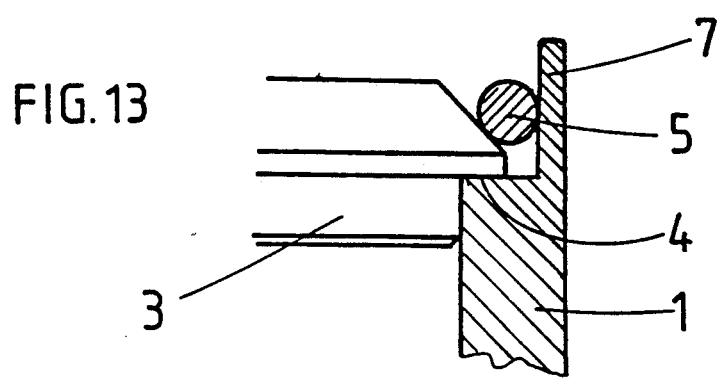
FIG. 13 is a section along XIII—XIII of FIG. 11.

FIGS. 11 to 13 represent an example of discontinuous restraint. The basic elements are the same as in FIG. 1, but without the notch 14. The thinned portion 7 is pushed down over the ring 5 over four sections 7a, 7b, 7c and 7d in a rectilinear fashion. The portions which have not undergone any deformation therefore extend between these sections, as represented in FIG. 13. If one of the ends of the split ring 5 is in a non-deformed portion, as represented in FIG. 11, the ring can be removed. If, on the other hand, the two ends of the split ring are situated at least approximately in the middle of a deformed section, the ring cannot be removed.

I claim:

1. A method for forming, in an internal wall of a tubular cylindrical part, a restraint intended to receive a ring for installing at least one closure part having a frustoconical portion on an internal bearing surface of said tubular cylindrical part, including the steps of: thinning a wall of the tubular part on its perimeter proximate to where said restraint is to be formed to form a thinned zone, placing said ring into engagement with said at least one part, deforming said thinned zone in at least two places using the ring as a means for forming the restraint, and leaving said ring in said restraint which is thereby formed, wherein the ring is a split ring and wherein the thinned wall is deformed over the split ring holding a slit of said split ring open, thereby allowing later removal of said split ring, wherein said step of thinning of said wall of said tubular part includes the step of forming an external groove, wherein the split ring is tightened to introduce it into the tubular part and wherein said ring is pushed onto the frustoconical portion of the closure part to push down the wall of the tubular in its thinned zone while externally retaining the tubular part of either side of the external groove.

2. The method for forming as claimed in claim 1, wherein the external groove is formed near to an edge of said tubular part.

3. The method for forming as claimed in claim 1, wherein said external groove is formed on said tubular part.

4. The method for forming as claimed in claim 1, further including the step of forming a restraint to receive a split ring installing a flat part, wherein a cylindrical part is introduced into the split ring to hold the split ring open while the thinned wall is deformed over the split ring by a crimping operation.

5. The method for forming as claimed in claim 1, including the step of forming a notch or a hole in the wall of the tubular part, in the region of the groove to be formed, wherein said notch or hole allows removal of said split ring.

6. A method of installing a circular part in a cylindrical tubular part by means of a split ring retained in an internal restraint of said tubular part, wherein said restraint is formed by the method as claimed in claim 1.

7. The method of installing as claimed in claim 6, wherein the circular part is a closure part.

8. The method of installing as claimed in claim 6, wherein the restraint includes a notch or hole to remove said split ring when one of the ends of the ring is opposite said notch or hole.

9. The method of installing as claimed in claim 6, wherein said split ring has a slit which is oblique relative to the radius of the said ring passing through the middle of said slit.

10. The method as claimed in claim 6, wherein an internal diameter of a deformed portion of said thinned wall is greater than a diameter of said circular part.

* * * * *